(12) United States Patent
Forrest et al.

(10) Patent No.: US 8,858,385 B2
(45) Date of Patent: Oct. 14, 2014

(54) LOCKING DIFFERENTIAL

(71) Applicant: Auburn Gear, Inc., Auburn, IN (US)

(72) Inventors: James L. Forrest, Ashley, IN (US); Dan M. Metzger, Fort Wayne, IN (US); John T. Fortman, Auburn, IN (US); Joseph A. Beals, Edgerton, OH (US); Aaron J. Binegar, Decatur, IN (US)

(73) Assignee: Auburn Gear, Inc., Auburn, IN (US)

( * ) Notice: Subject to any disclaimer, the term of this patent is extended or adjusted under 35 U.S.C. 154(b) by 0 days.

(21) Appl. No.: 13/829,927

(22) Filed: Mar. 14, 2013

(65) Prior Publication Data

US 2014/0121055 A1    May 1, 2014

Related U.S. Application Data

(60) Provisional application No. 61/719,161, filed on Oct. 26, 2012.

(51) Int. Cl.
*F16H 48/20* (2012.01)
*F16H 48/24* (2006.01)

(52) U.S. Cl.
CPC ..................................... *F16H 48/24* (2013.01)
USPC ......................................................... 475/231

(58) Field of Classification Search
CPC ................................ F16H 48/22; F16H 48/24
See application file for complete search history.

(56) References Cited

U.S. PATENT DOCUMENTS

| | | |
|---|---|---|
| 2,545,601 A | 3/1951 | Bruaker |
| 4,759,232 A | 7/1988 | Roberts |
| 5,007,886 A | 4/1991 | Holmquist et al. |
| 5,413,015 A | 5/1995 | Zentmyer et al. |
| 5,531,653 A | 7/1996 | Barnholt |
| 5,637,049 A | 6/1997 | Zentmyer et al. |
| 5,759,126 A | 6/1998 | Zentmyer et al. |
| 5,759,129 A | 6/1998 | Zentmyer et al. |
| 5,816,971 A | 10/1998 | Zentmyer et al. |
| 5,901,618 A * | 5/1999 | Tyson et al. ...................... 74/650 |
| 6,053,073 A * | 4/2000 | Tyson et al. ...................... 74/650 |
| 6,062,105 A * | 5/2000 | Tyson et al. ...................... 74/650 |
| 6,524,211 B2 | 2/2003 | Okazaki |
| 6,551,209 B2 | 4/2003 | Cheadle et al. |
| 6,681,654 B2 | 1/2004 | Zentmyer et al. |
| 7,264,569 B2 | 9/2007 | Fox |
| 7,758,462 B2 | 7/2010 | Veldman et al. |
| 7,824,296 B2 * | 11/2010 | Lyman ........................... 475/231 |
| 8,100,805 B2 | 1/2012 | Dayton |
| 8,202,188 B2 | 6/2012 | Honda |
| 2009/0011890 A1 | 1/2009 | Bawks |
| 2010/0093481 A1 * | 4/2010 | Lyman ........................... 475/231 |

FOREIGN PATENT DOCUMENTS

JP         2253032 A    10/1990

* cited by examiner

*Primary Examiner* — David D Le
(74) *Attorney, Agent, or Firm* — Faegre Baker Daniels LLP (57) ABSTRACT

A selectively locked differential has a locked configuration in which both side gears are independently locked to the differential casing so that torque is not transmitted through the pinion gears. The locking of the side gears is accomplished by generally cylindrical, ring-shaped structures with castellations on one axial end surface of each structure. These castellations selectively interfit with rotatably fixed castellations of secondary structures fixed to the differential casing, such that the ring-shaped structures define a mechanically interconnected, zero-slip arrangement with respect to the rotationally fixed secondary structures when the differential is in the locked configuration.

20 Claims, 10 Drawing Sheets

FIG_3

FIG. 4

FIG_5

FIG_6

FIG_10

LOCKING DIFFERENTIAL

CROSS REFERENCE TO RELATED APPLICATIONS

The present application claims the benefit under Title 35, U.S.C. Section 119(e) of U.S. Provisional Patent Application Ser. No. 61/719,161, filed Oct. 26, 2012 and entitled LOCKING DIFFERENTIAL, the entire disclosure of which is hereby expressly incorporated herein by reference.

BACKGROUND

1. Technical Field

The present disclosure relates to a differential, and, more particularly, to a locking differential in which each side gear is independently locked to the differential casing so that torque is not transmitted through the pinion gears when the differential is locked.

2. Description of the Related Art

Differential gear sets are employed to allow a pair of driven wheels connected to aligned axle half shafts to be driven at differential speeds. For example, when a vehicle turns the outside wheel must rotate faster than the inside wheel. To allow for such cornering while maintaining tires in consistent rolling contact with the ground, the differential gear set allows one of the output half shafts to rotate at a different speed as compared to the other output half shaft.

In some circumstances, it can be desirable to lock the differential such that two driven half shafts do not allow for differential rotational speeds of their wheel. For example, if the vehicle loses sure footing such that one of the two wheels receives little resistance to its rotation while the other wheel has normal or high resistance, nearly all rotational input to the differential will be transferred to the low-traction wheel, causing it to spin freely over the low-traction surface while the high-traction wheel receives no rotational input. This allocation of rotational input to the low-traction wheel can prevent the vehicle from moving in response to torque input to the differential. However, if the differential is locked, the wheels are constrained to rotate at the same speed and the higher-traction wheel can use its torque to move the vehicle.

Existing locking differentials utilize various structures to lock one of the side gears to the differential casing. With one of the side gears locked to the differential casing, torque input to the differential casing is transferred via the locked side gear to the corresponding axle half shaft. Further, because one of the side gears is locked to the differential casing, rotation of the pinion gears is disallowed so that torque transmitted to the differential casing is further transmitted through the pinion gears to the non-locked side gear so that both side gears (and the associated axle half shafts) rotate at the same speed as the differential casing.

Existing "limited slip" type differentials utilize clutch arrangements in engagement with one or both of the side gears and the differential casing. The clutch(es) can be actuated to provide a high frictional resistance to rotation of the side gear(s) relative to the differential case, thereby transferring some torque to a higher-traction wheel when the clutches are actuated. U.S. Pat. No. 5,531,653 shows one such limited slip differential design.

Yet another differential design, such as the Detroit Locker® differentials available from Eaton Corporation of Cleveland, Ohio utilize multi-piece differential casing structures that normally transmit torque to both driven wheels but allow differential rotation when a threshold differential torque is applied to the wheels. U.S. Pat. No. 6,681,654 shows a locked differential in which axle couplers are drivingly engaged with axle drivers by a plurality of mutually engaging teeth formed on respective faces of the couplers and drivers. A camming interrelationship between the two drivers operates to pull the driver inward to clear the driving teeth from the axle coupler when differential rotation occurs.

SUMMARY

The present disclosure provides a selectively locked differential having a locked configuration in which both side gears are independently locked to the differential casing so that torque is not transmitted through the pinion gears. The locking of the side gears is accomplished by generally cylindrical, ring-shaped structures with castellations on one axial end surface of each structure. These castellations selectively interfit with rotatably fixed castellations of secondary structures fixed to the differential casing, such that the ring-shaped structures define a mechanically interconnected, zero-slip arrangement with respect to the rotationally fixed secondary structures when the differential is in the locked configuration.

In one form thereof, the present disclosure provides a differential comprising: a differential casing defining a longitudinal axis, a first set of rotatably fixed castellations and a second set of rotatably fixed castellations affixed to the differential casing; a first side gear and a second side gear each rotatable with respect to the differential casing about the longitudinal axis, the first side gear and the second side gear each adapted to be rotatably fixed to a half shaft; at least one pinion gear intermeshingly engaged with the first side gear and the second side gear, the pinion gear rotatable about a pinion gear axis when the first side gear rotates at a rotational speed different from the second side gear; a first clutch plate rotatably fixed to the first side gear and having an end surface with a first set of rotatable castellations formed thereon, the first clutch plate axially moveable within the differential casing between an engaged position and a disengaged position, the first set of rotatable castellations interfitted with the first set of rotatably fixed castellations of the differential casing when the first clutch plate is in the engaged position, the first set of rotatable castellations spaced from the first set of rotatably fixed castellations of the differential casing when the first clutch plate is in the disengaged position, whereby the first side gear is selectively rotatably fixed to the differential casing via the first clutch plate; and a second clutch plate rotatably fixed to the second side gear and having an end surface with a second set of rotatable castellations formed thereon, the second clutch plate axially moveable within the differential casing between an engaged position and a disengaged position, the second set of rotatable castellations interfitted with the second set of rotatably fixed castellations of the differential casing when the second clutch plate is in the engaged position, the second set of rotatable castellations spaced from the second set of rotatably fixed castellations of the differential casing when the second clutch plate is in the disengaged position, whereby the second side gear is selectively rotatably fixed to the differential casing via the second clutch plate, whereby the differential has a locked condition in which each of the side gears is independently locked to the differential casing and torque is not transmitted through the pinion gear.

In another form thereof, the present disclosure provides a differential comprising: a differential casing having a hollow cavity formed therein, the hollow cavity defining a longitudinal axis; a first side gear and a second side gear each rotatable with respect to the differential casing about the longitudinal axis, the first side gear and the second side gear each adapted to be rotatably fixed to a half shaft; a pinion housing rotatably affixed to the differential casing and having an end surface with a first set of rotatably fixed castellations formed thereon; at least one pinion gear intermeshingly engaged with the first side gear and the second side gear, the pinion gear rotatably mounted to the pinion housing; a differential end plate rotatably fixed to the differential casing, the differential end plate having an end surface with a second set of rotatably fixed castellations formed thereon; a first clutch plate rotatably fixed to the first side gear and having an end surface with a first set of rotatable castellations formed thereon, the first clutch plate axially moveable along a first direction from a disengaged position in which the first set of rotatable castellations are spaced from the first set of rotatably fixed castellations of the pinion housing, toward an engaged position in which the first set of rotatable castellations are intermeshingly engaged with the first set of rotatably fixed castellations; and a second clutch plate rotatably fixed to the second side gear and having an end surface with a second set of rotatable castellations formed thereon, the second clutch plate axially moveable along the first direction from a disengaged position in which the second set of rotatable castellations are spaced from the second set of rotatably fixed castellations of the differential end plate, toward an engaged position in which the second set of rotatable castellations are intermeshingly engaged with the second set of rotatably fixed castellations.

In yet another form thereof, the present disclosure provides a differential comprising: a differential casing having a hollow cavity formed therein, the hollow cavity defining a longitudinal axis, a first set of rotatably fixed castellations and a second set of rotatably fixed castellations affixed to the differential casing within the hollow cavity; a first side gear and a second side gear each disposed in the hollow cavity and rotatable with respect to the differential casing about the longitudinal axis, the first side gear and the second side gear each adapted to be rotatably fixed to a half shaft; at least one pinion gear disposed in the hollow cavity and intermeshingly engaged with the first side gear and the second side gear; a first clutch plate disposed in the hollow cavity and rotatably fixed to the first side gear and having an end surface with a first set of rotatable castellations formed thereon, the first clutch plate axially moveable from a disengaged position in which the first set of rotatable castellations are spaced from the first set of rotatably fixed castellations, toward an engaged position in which the first set of rotatable castellations are intermeshingly engaged with the first set of rotatably fixed castellations; a second clutch plate disposed in the hollow cavity and rotatably fixed to the second side gear and having an end surface with a second set of rotatable castellations formed thereon, the second clutch plate axially moveable from a disengaged position in which the second set of rotatable castellations are spaced from the second set of rotatably fixed castellations, toward an engaged position in which the second set of rotatable castellations are intermeshingly engaged with the second set of rotatably fixed castellations; and an actuator having at least one actuation pin actuatable to a locked configuration in which the actuation pin advances into the hollow cavity of the differential casing to simultaneously urges the first clutch plate and the second clutch plate toward their respective engaged positions.

BRIEF DESCRIPTION OF THE DRAWINGS

The above-mentioned and other features of the disclosure, and the manner of attaining them, will become more apparent and will be better understood by reference to the following description of embodiments of the disclosure taken in conjunction with the accompanying drawings, wherein.

Corresponding reference characters indicate corresponding parts throughout the several views. The exemplifications set out herein illustrate embodiments of the disclosure and such exemplifications are not to be construed as limiting the scope of the invention in any manner.

DETAILED DESCRIPTION

Figure 1:
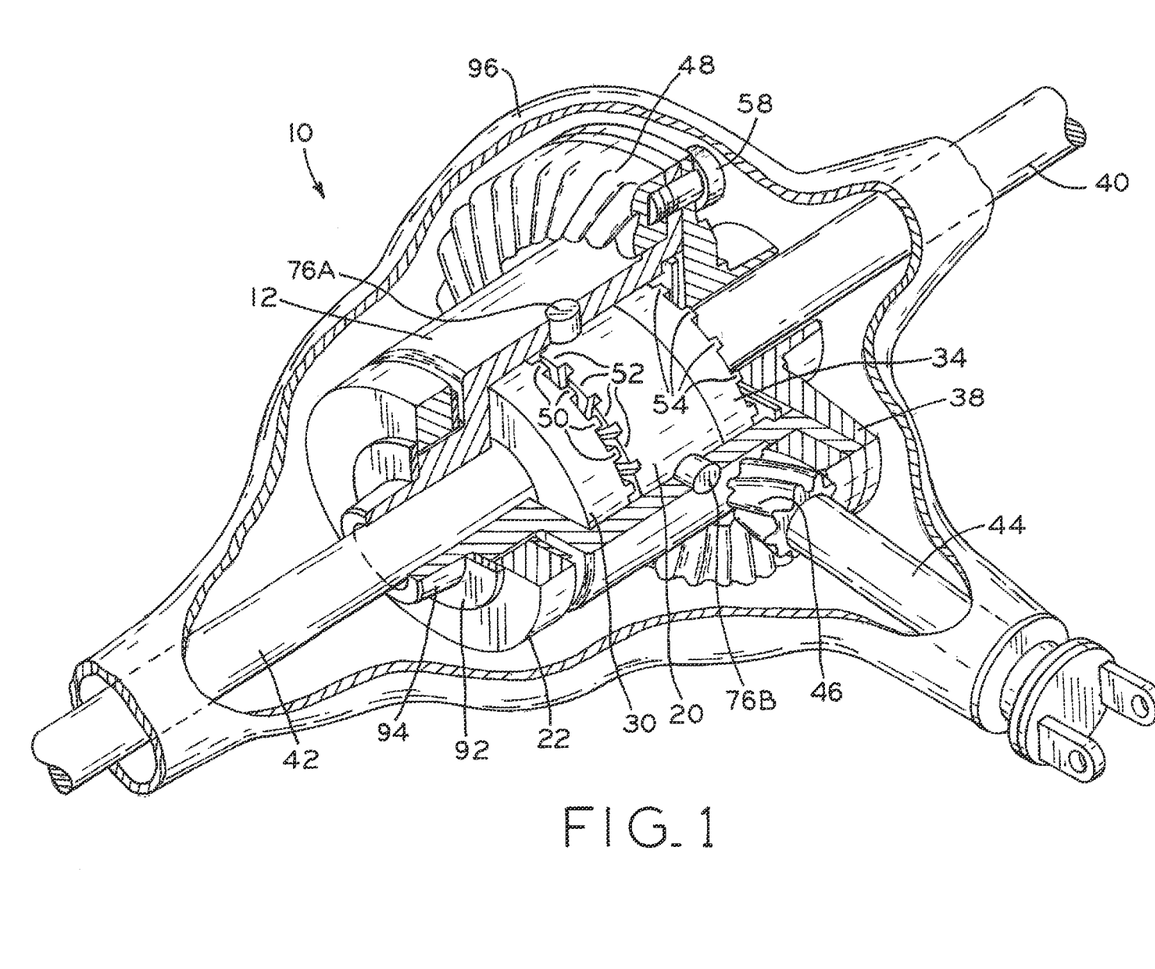
FIG. 1 is a perspective, partial cutaway view of a locking differential in accordance with the present disclosure.

The present disclosure provides a locking differential, such locking differential 10 shown in FIG. 1, which includes a binary locking feature such that the differential is capable of being selectively configured into one of an unlocked or a locked condition to allow or prevent differential rotation between two axle half shafts. In such a binary configuration, differential 10 does not utilize a "limited slip" configuration in which the axle half shafts are partially locked, that is, are not allowed to freely rotate with respect to one another but are also not entirely prevented from relative rotation.

Figure 2:
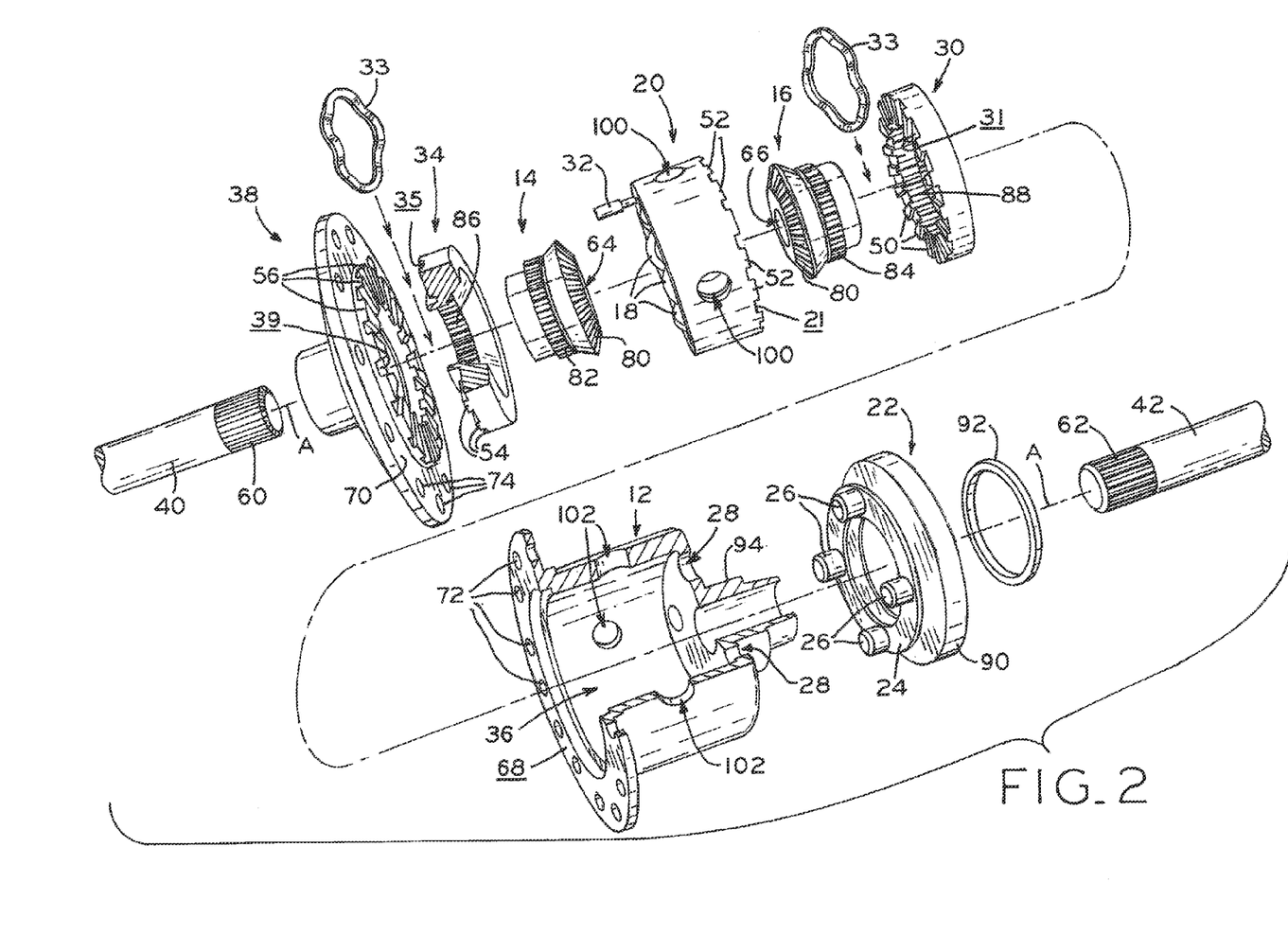
FIG. 2 is an exploded, perspective view of the locking differential shown in FIG. 1.

The binary locking feature of differential 10 is provided by a pair of clutch plates 30, 34 which are axially moveable within differential casing 12 to selectively rotatably lock a pair of side gears 14, 16 (FIG. 2) with respect to differential casing 12. As described in detail below, this rotatable locking of side gears 14, 16 is accomplished using first and second sets of rotatable castellations 50, 54 which selectively engage corresponding first and second sets of rotatably fixed castellations 52, 56 (FIG. 2). Clutch plates 30, 34 each move in a common axial direction along longitudinal axis A when toggling between their respective engaged to the disengaged positions, thereby facilitating the use of a single actuator 22 to rotatably fix or decouple side gears 14, 16 with respect to differential casing 12.

As used herein, two parts are considered to be "rotatably fixed" with respect to one another if those two parts are not rotatable with respect to one another about their respective axes of rotation. Thus, for example, left side gear 14 is considered to be rotatably fixed to left axle half shaft 40 because left side gear 14 includes splines 65 formed on the inner bore 64 thereof which matingly engage splines 60 formed on left axle half shaft 40, thereby preventing rotation of side gear 14 relative to half shaft 40. Similarly, a single part is considered to be "rotatably fixed" if that part is not rotatable within the relevant frame of reference (i.e., with respect to the other parts referred to in that frame of reference). Thus, for example, castellations 56 formed on differential end plate 38 are considered "rotatably fixed" in the context of locking differential 10 because end plate 38 does not rotate with respect to the other components of differential 10 (as described in further detail below), even though the entire locking differential 10, including end plate 38, rotates when power is applied to drive shaft 44 (as also described below).

Conversely, for purposes of the present disclosure, a first part that is "rotatably mounted" to a second part is considered to be rotatable with respect to such second part. Thus, for example, clutch plates 30, 34 are rotatably mounted to differential casing 12 because clutch plates 30, 34 are able to rotate within hollow cavity 36 defined by casing 12 when clutch plates 30, 34 are disengaged (as further described below). Similarly, a single part is considered to be "rotatable" if that part is able to rotate within the relevant frame of reference, such as rotatable castellations 50, 54 formed on clutch plates 30, 34, in the context of the parts making up locking differential 10.

For purposes of the present disclosure, various structures of locking differential 10 may be said to define axial "end surfaces," which are surfaces at an axial end of the structure with respect to longitudinal axis A. Except as otherwise specified herein, the exemplary axial end surfaces shown in the figures and described further below define one or more surface planes which are substantially perpendicular to longitudinal axis A. Thus, for example, end surface 68 of differential casing 12 (FIG. 2) is an annular, substantially planar surface located at an axial end of casing 12, and defines a plane that is substantially perpendicular to longitudinal axis A. Similarly, mating end surface 70 of differential end plate 38, which mates with end surface 68 of casing 12 upon assembly of differential 10, is also disposed at an axial end of differential end plate 38 and defines a plane that is substantially normal to longitudinal axis A.

Referring now to FIG. 1, locking differential 10 is shown in the context of a power train system, such as a vehicle differential used to transmit power from the engine of the vehicle to driven wheels of the vehicle. For example, drive shaft 44 may be operably connected to a vehicle power source, such as an internal combustion engine or electric motor. Power is transmitted from the engine to drive shaft 44, which includes drive gear 46 at a terminal end thereof in splined engagement with ring gear 48. Ring gear 48, in turn, is affixed to differential casing 12 by a plurality of fasteners 58, which pass through apertures 72, 74 (FIG. 2) formed in differential casing 12 and differential end plate 38, respectively, and thread into threaded bores formed in the non-splined side of ring gear 48. Locking differential 10 may be covered by differential housing 96, which contains lubricants for the various parts of differential 10 and protects the gears and bearing surfaces from outside contamination.

As ring gear 48 rotates, torque is transferred to differential casing 12, thereby causing rotation of differential casing 12 and associated components rotatably fixed thereto, including pinion housing 20, differential end plate 38, and actuator 22. More particularly, actuator 22 is rotatably fixed to differential casing 12 by actuator pins 26 received within actuation apertures 28, as best shown in FIG. 2. Pinion housing 20 is rotatably fixed to differential casing 12 via pinion gear axle shafts 76a, 76b (FIGS. 1 and 7), which pass through the side wall of the substantially cylindrical pinion gear housing 20 and into the adjacent side wall of differential casing 12 as shown in FIG. 1. Differential end plate 38 is fixed to differential casing 12 by fasteners 58, as noted above.

Transfer of torque from differential casing 12 and the other components rotatably fixed thereto and left and right axle half shafts 40, 42 may be accomplished in one of two ways, depending on whether locking differential 10 is in the locked or unlocked configuration. As further described below, pinion gears 18 participate in the transfer of torque from casing 12 to side gears 14 and 16 in the unlocked configuration. In the locked configuration, on the other hand, torque is transferred through pinion housing 20 and clutch plates 30, 34 while pinion gears 18 are bypassed.

FIGS. 1 and 3-5 all illustrate locking differential 10 in the unlocked configuration. In this configuration, a first set of rotatable castellations 50 formed on end surface 31 of clutch plate 30 are spaced from a corresponding set of rotatably fixed castellations 52 formed on end surface 21 of pinion housing 20. In an exemplary embodiment, the spacing between castellations 50 and 52 is at least 0.025 inches to ensure that no interaction therebetween will occur during operation of differential 10. Similarly, a second set of rotatable castellations 54 formed on end surface 35 of clutch plate 34 are spaced from a corresponding second set of rotatably fixed castellations 56 formed on end surface 39 of differential end plate 38 near mating surface 70.

Figure 3:
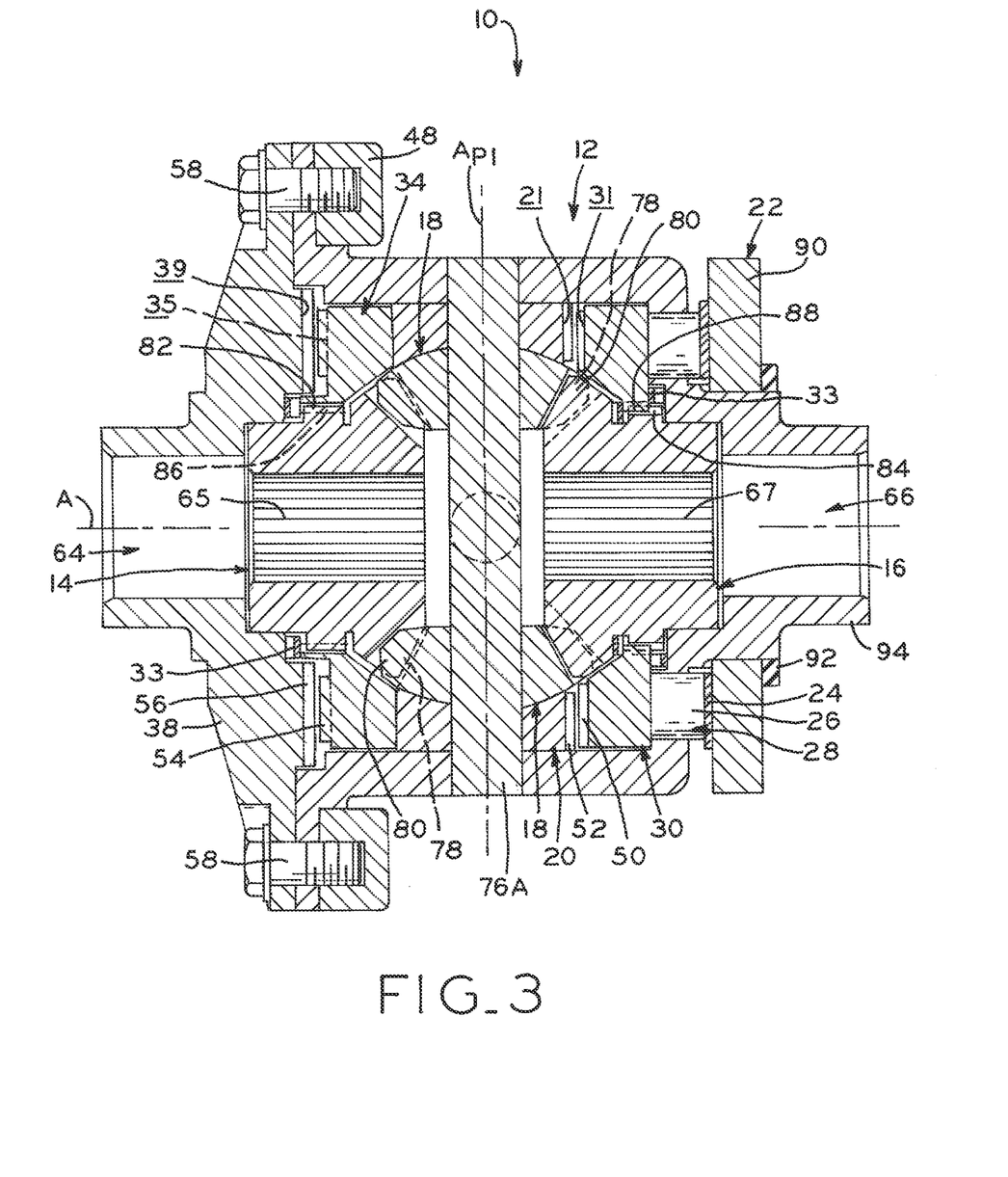
FIG. 3 is an elevation, cross-section view of the locking differential shown in FIG. 1, in which the differential is in an unlocked configuration.
Figure 4:
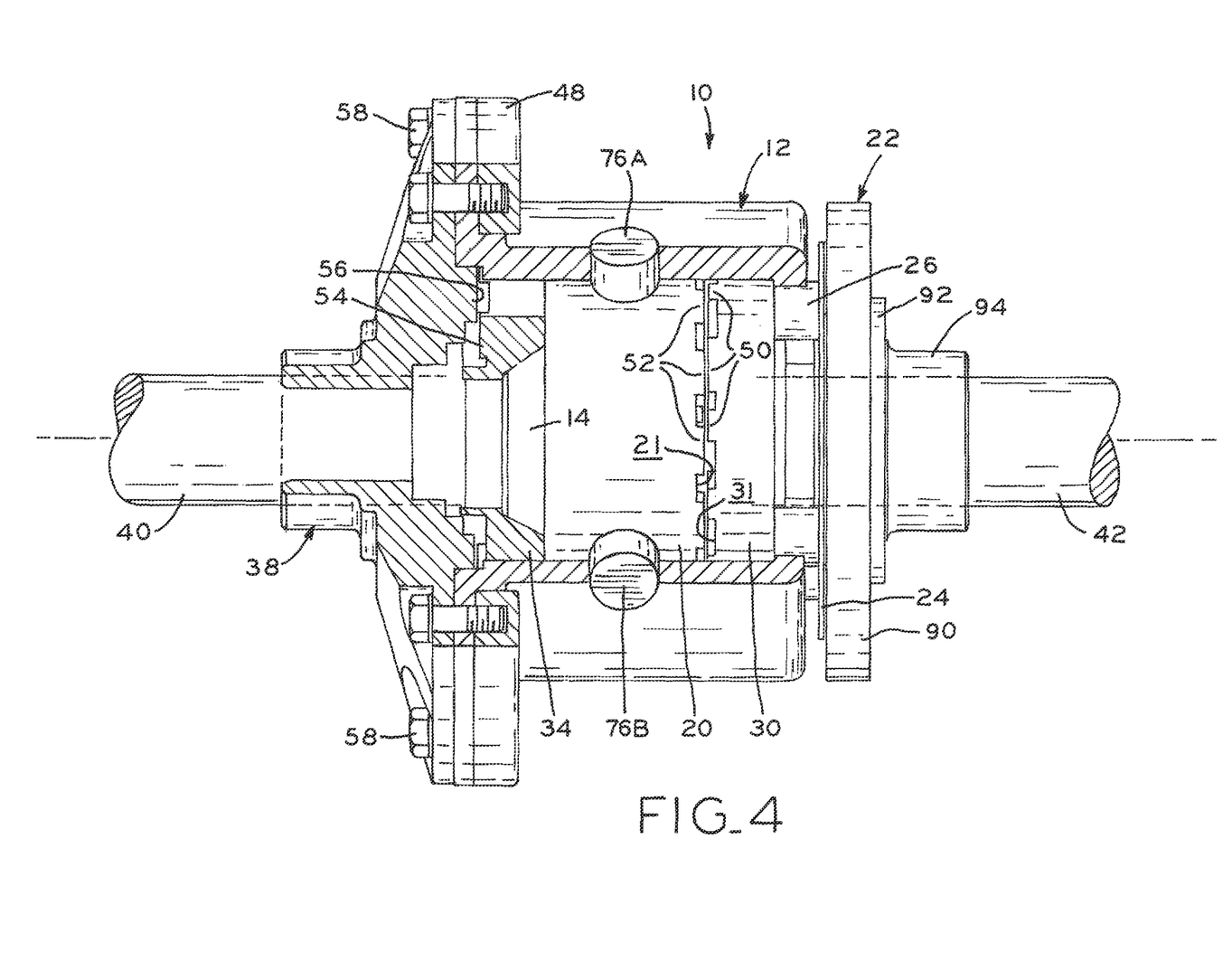
FIG. 4 is an elevation, partial cutaway view of the locking differential shown in FIG. 1, in which the differential is in the unlocked configuration.

In the above-described spaced, non-interfitting relationship between castellations 50, 52 and 54, 56, clutch plates 30 and 34 are free to rotate with respect to pinion housing 20 and differential end plate 38, respectively (and are therefore also rotatable with respect to differential casing 12). However, pinion gears 18 include respective pinion gear splines 78 which are intermeshingly engaged with correspondingly formed side gear splines 80 on each of side gears 14 and 16, as best shown in FIG. 3, preventing free rotation of side gears 14, 16 without also rotating pinion gears 18. Meanwhile, side gears 14, 16 include splines 65, 67 formed in bores 64, 66, respectively, which intermeshingly engage with axle splines 60, 62 of half shafts 40, 42 respectively (FIG. 2).

Figure 7:
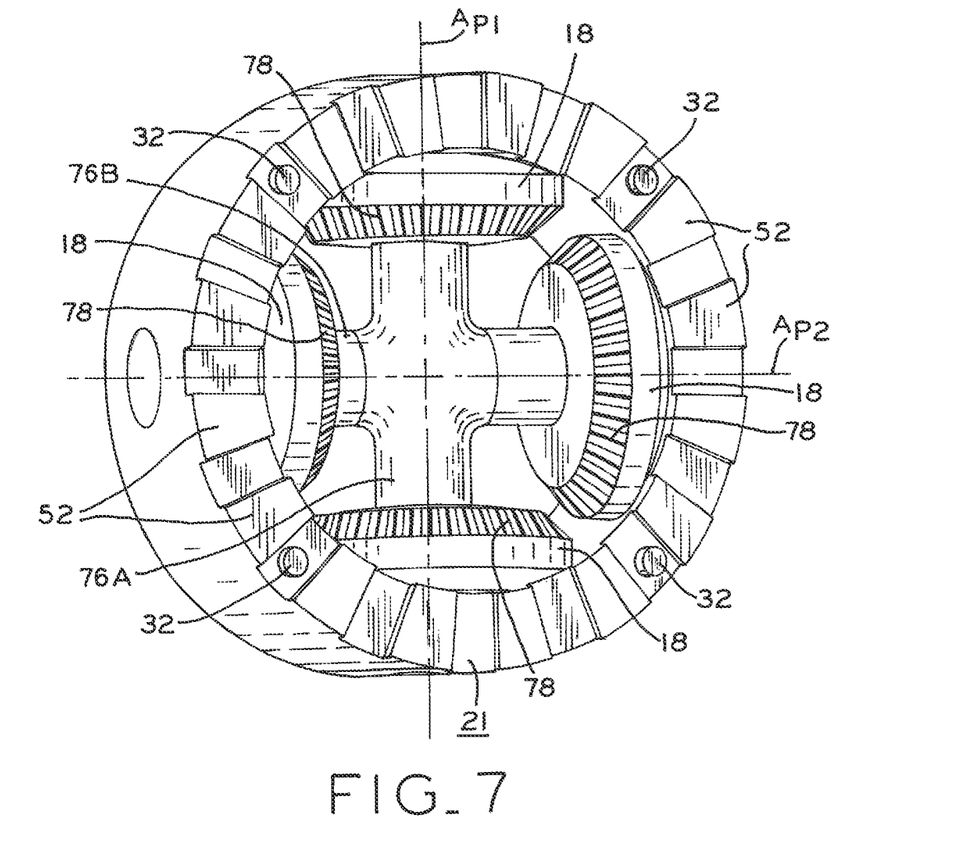
FIG. 7 is a perspective view of a pinion gear housing made in accordance with the present disclosure, with pinion gears mounted thereto.

Thus, as differential casing 12 rotates under power from drive shaft 44, pinion gears 18 circumnavigate longitudinal axis A as pinion housing 20 rotates together with casing 12. In the absence of any differential rotation of left and right axle half shafts 40, 42, such as may arise from different levels of traction available to vehicle wheels mounted at respective ends of half shafts 40, 42, pinion gears 18 transfer torque to side gears 14, 16 via splines 78, 80 and the circumnavigation of pinion gears 18 also rotates each side gear 14, 16 about longitudinal axis A. The splined engagement of side gears 14, 16 with half shafts 40, 42, in turn, drives the wheels and moves the vehicle forward in a straight line. During this straight line vehicle movement, pinion gears 18 continue to circumnavigate longitudinal axis A but do not rotate about their respective pinion axes $A_{P1}, A_{P2}$ (FIG. 7).

However, in some instances left and right axle half shafts 40, 42 are urged to rotate at different speeds. For example, one wheel may lose traction and spin faster than the other wheel, or the vehicle may corner causing the outside wheels to rotate faster than the inside wheels. During such differential rotation, one of side gears 14, 16 rotates with respect to the other, causing pinion gears 18 to rotate about their respective pinion gear axes $A_{P1}, A_{P2}$. This rotation of pinion gears 18 facilitates differential rotation of side gears 14, 16 while maintaining rolling contact of the wheels mounted to half shafts 40, 42.

This differential rotation is allowed because side gears 14, 16 are free to rotate with respect to differential casing 12 and the other associated components rotationally fixed thereto, but disallowed when side gears 14, 16 become rotationally fixed to casing 12 as further described below.

When left side gear 14 rotates with respect to differential casing 12, left clutch plate 34 also experiences rotation because left clutch plate 34 is rotationally fixed to left side gear 14. More particularly, referring to FIG. 2, left side gear 14 includes outer surface splines 82 which are intermeshingly engaged with inner surface splines 86 formed along the inner bore of left clutch plate 34. Similarly, right side gear 16 includes outer surface splines 84 which rotatably fix side gear 16 to inner surface splines 88 of right clutch plate 30, such that right clutch plate 30 rotates relative to differential casing 12 when right side gear 16 so rotates.

Figure 6:
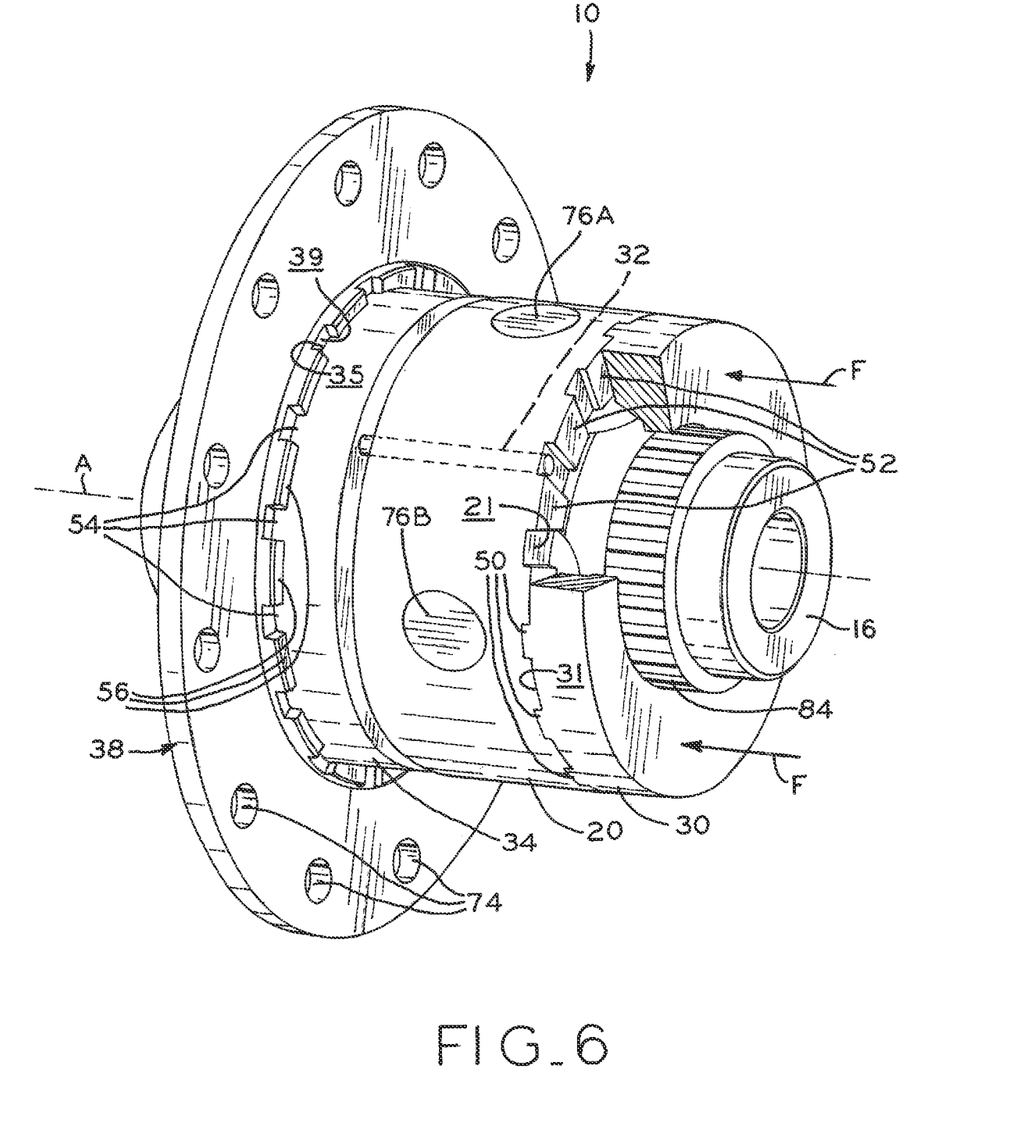
FIG. 6 is a perspective, partial cutaway view of the locking differential components shown in FIG. 5, in which the differential has been toggled to a locked configuration.

FIG. 6 illustrates the locked configuration of locking differential 10. In the locked configuration, right clutch plate 30 is urged to move along longitudinal axis A by forces F, which may be provided by actuator 22 as further described below. When so urged, clutch plate 30 advances along longitudinal axis A toward differential end plate 38. In the engaged position, the first set of rotatable castellations 50 formed on the illustrated axial end surface 31 of clutch plate 30 interfit with the first set of rotatably fixed castellations 52 formed on the adjacent end surface 21 of pinion housing 20, such that rotatable castellations 50 are received between rotatably fixed castellations 52, and vice versa. When so interfitted, relative rotation between pinion housing 20 and clutch plate 30 is completely prevented, such that right side gear 16 is not allowed to rotate relative to differential casing 12 and the other rotatably fixed structures of differential 10, including pinion housing 20 and differential end plate 38.

Figure 5:
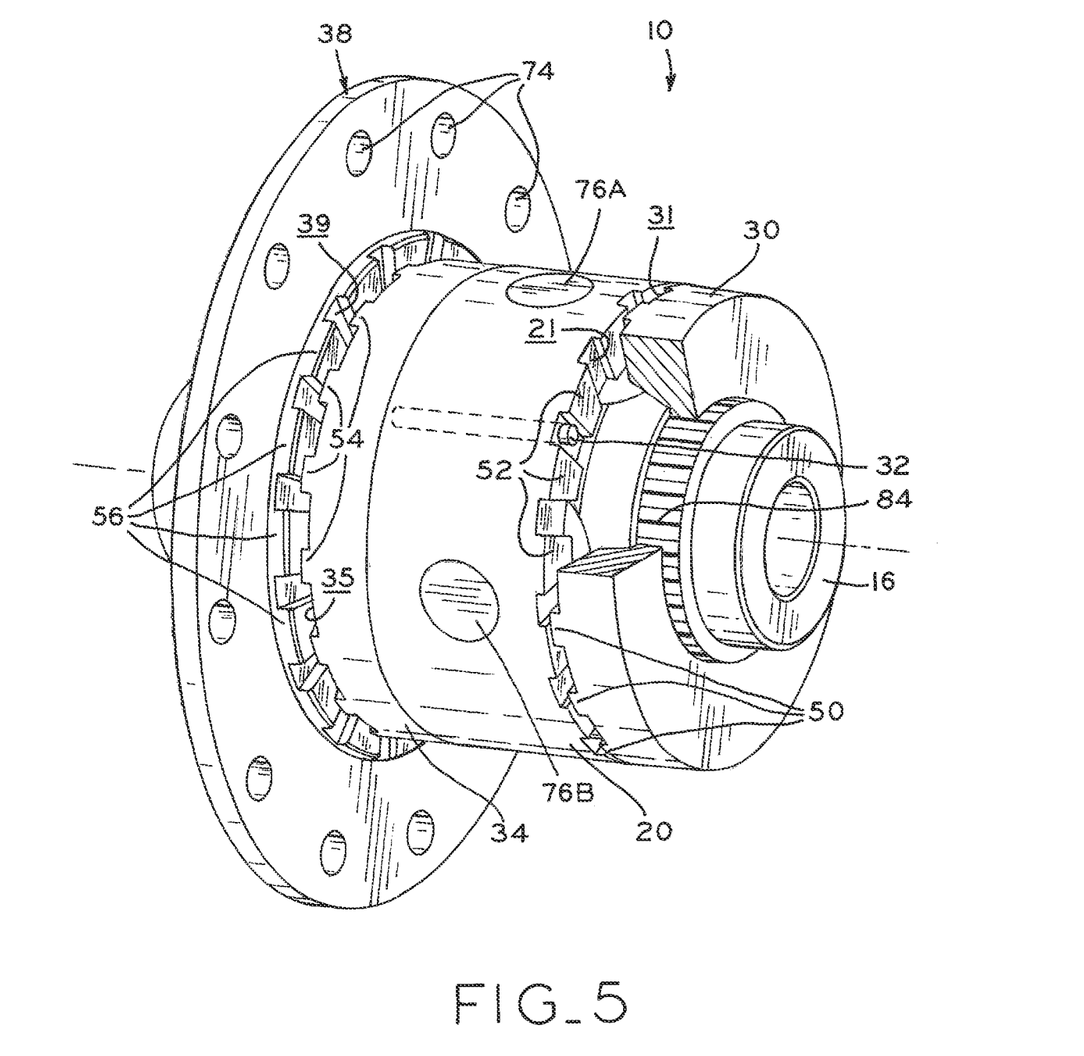
FIG. 5 is a perspective view of selected components of the locking differential shown in FIG. 1, in which the differential is shown in the unlocked configuration.

The axial movement of right clutch plate 30 causes a corresponding axial movement of left clutch plate 34 in the same direction, i.e., toward differential end plate 38. This corresponding axial movement is effected by the depression of lock pins 32 by castellations 50 of right clutch plate 30, as best illustrated by a comparison between FIGS. 5 and 6. As illustrated in FIG. 5, lock pin 32 protrudes outwardly from axial end surface 21 of pinion housing 20, and is disposed between a neighboring pair of rotatably fixed castellations 52. When one of rotatable castellations 50 is received within the space occupied by lock pin 32, the axial movement of castellation 50 into this space causes castellation 52 to advance toward end surface 21 thereby depressing lock pin 32. As shown in FIG. 6, this depression pushes the opposite axial end of lock pine 32 outwardly, causing lock pin 32 to abut and urge clutch plate 34 toward differential end plate 38. As clutch plate 34 moves axially away from pinion housing 20, the second set of rotatable castellations 54 interfit with the second set of rotatably fixed castellations 56 formed on differential end plate 38. This interfitting of castellations 54, 56 rotatably fixes left clutch plate 34 to differential end plate 38, thereby entirely preventing relative rotation of left clutch plate 34 and left side gear 14 with respect to differential casing 12 and associated rotatably fixed structures.

Thus, when forces F are applied to right and left clutch plates 30, 34, locking differential 10 is toggled from a disengaged configuration to an engaged configuration, in which relative rotation between left and right side gears 14, 16 is completely prevented. This disallowance of differential rotation further dictates that left and right axle half shafts 40, 42 must rotate at the same speed, thereby ensuring that torque is applied to both wheels driven by locking differential 10 equally. This arrangement has benefits in certain applications, such as off road applications or other instances where reduced traction is experienced by one or both of the driven wheels.

Figure 8:
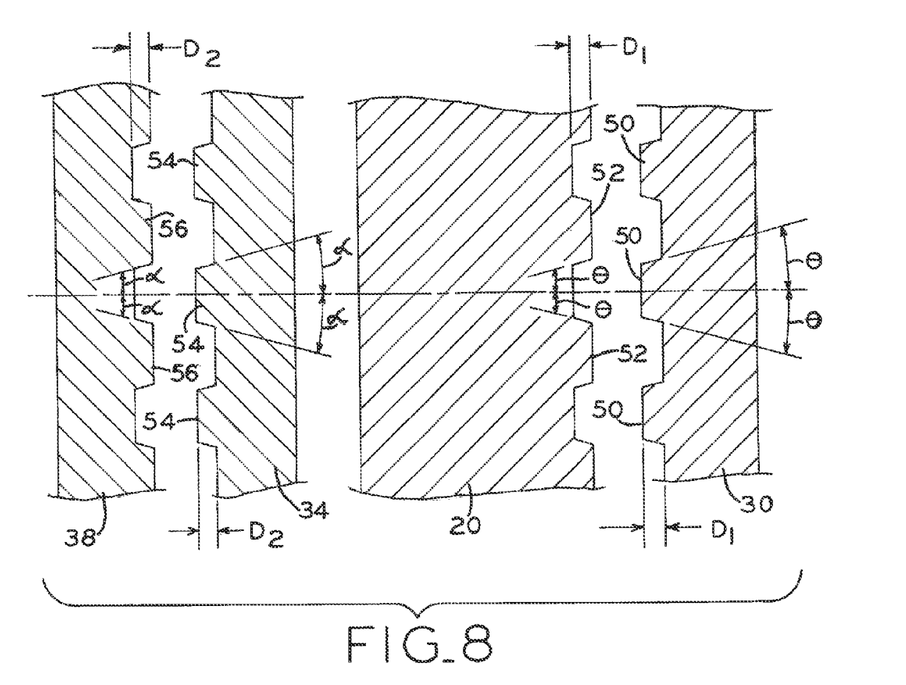
FIG. 8 is a side elevation view of a portion of the locking differential of FIG. 1, illustrating detail of castellations formed on structures within the locking differential.

FIG. 8 illustrates detail of the interfitting geometries of rotatable castellations 50, 54 of clutch plates 30, 34 respectively and rotatably fixed castellations 52, 56 of pinion housing 20 and end plate 38, respectively. Rotatable castellations 50 and the interfitting fixed castellations 52 each define a common castellation depth $D_1$, which is measured along longitudinal axis A. Castellations 50, 52 also define a common draft angle $\Theta$, which is the angle between respective lateral walls of castellations 50, 52 and longitudinal axis A. When castellations 50, 52 are interfitted with one another (as shown in FIG. 6), the respective lateral walls of castellations 50, 52 bear against one another and present a physical barrier to relative rotation between clutch plate 30 and pinion housing 20. Similarly, rotatable castellations 54 and the interfitting fixed castellations 56 each define a common castellation depth $D_2$, and a common draft angle $\alpha$ to provide a physical barrier to rotation between clutch plate 34 and end plate 38. Depths $D_1$ and $D_2$ and angles $\Theta$, $\alpha$ may be the same or different, depending on what is required or desired for a particular application.

In an exemplary embodiment, depths $D_1$ and $D_2$ are between 0.075 inches and 0.225 inches, such as 0.125 inches. Angles $\Theta$, $\alpha$ may be between −1 degrees (i.e., oppositely arranged from the illustrated angle and having a nominal value of 1 degree) and 5 degrees, such as 1 degree. Where the intermeshing gearing components of locking differential 10 are made of steel and actuator 22 provides a total force F of about 100 lb, locking differential can transmit up to 6,000 ft-lbs of torque to half shafts 40, 42.

With right clutch plate 30 rotatably fixed to pinion housing 20, and left clutch plate 34 rotatably fixed to differential end plate 38, torque is transmitted from drive shaft 44 (FIG. 1) to side gears 14 and 16 via differential casing 12, pinion housing 20, differential end plate 38 and right and left clutch plate 30 and 34, respectively. Thus, unlike in the unlocked configuration described above, pinion gears 18 do not participate in the transfer of torque from drive shaft 44 to side gears 14 and 16 when locking differential 10 is in the locked configuration. This protects pinion gears 18 from wear or damage when differential 10 is locked, and provides more efficient and effective mechanisms for torque transfer through differential 10 in the locked configuration.

Moreover, larger and more chaotic transfers of torque are increasingly likely when differential 10 is in the locked configuration because uneven traction may be available to the wheels. As noted above, pinion gear splines 78 and side gear splines 80 are responsible for transferring torque from drive shaft 44 to axle half shafts 40, 42 during normal operation of a vehicle on dry pavement or other high traction surfaces. Thus, splines 78 and 80 experience normal wear during "normal driving," e.g. operation of the vehicle on roadways or other improved surfaces. On the other hand, locking differential 10 is placed into the locked configuration when reduced or uneven traction is available to the vehicle wheels, such as in off-road applications. In these instances, pinion gear splines 78 and side gears splines 80 are relieved from the potentially heavy duty associated with torque transfer in off road driving, and castellations 50, 52 and 54, 56 assume this duty.

As best shown in FIG. 3, castellations 50, 52, 54, 56 are positioned radially outwardly of splines 78, 80 with respect to longitudinal axis A thereby increasing the distance between longitudinal axis A and the torque transferring structure, thereby increasing the lever arm available, reducing the reaction torque felt by clutch plates 30, 34 and enhancing the ability to transfer high amounts of torque when differential 10 is in the locked configuration. In addition, the associated torque-transferring parts of locking differential 10 utilized in the locked configuration, i.e., pinion housing 20, clutch plates 30, 34 and differential end plate 38, are generally cylindrically shaped structures in which torque transfer happens through the cylindrical wall of the structure. As a skilled artisan will recognize, cylinders are well suited to transfer large amounts of torque, thereby rendering these structures of locking differential 10 ideally suited to the heavy duty associated with the locked configuration.

In the exemplary embodiment shown in FIG. 2, actuator 22 provides the motive force for toggling locking differential 10 from the unlocked configuration to the locked configuration. Actuator 22 includes actuator pins 26 affixed to lock plate 24, which is axially displaceable along longitudinal axis A with respect to actuator body 90. In an exemplary embodiment, actuator body 90 is an electromagnetic coil which can be energized to urge lock plate 24 and actuator pins 26 axially away from actuator body 90, and de-energized or oppositely energized to draw lock plate 24 back toward actuator body 90.

Pins 26 are received into hollow cavity 36 of differential casing 12 via actuation apertures 28, as best shown in FIGS. 2 and 3. Upon actuation, a distal axial end of pins 26 comes into abutting engagement with the end surface of right clutch plate 30 opposite castellations 50, thereby imparting force F (FIG. 6) upon right clutch plate 30 as described above. Biasing element 33 is disposed between on right clutch plate 30 and right side gear 16, such that biasing element 33 urge clutch plate 30 out of engagement with pinion housing 20 when pins 26 are withdrawn. Similarly, another biasing element 33 may be disposed between left clutch plate 34 and differential end plate 38, such that the expansion biasing force withdraws rotatable castellations 54 out of engagement with rotatably fixed castellations 56 when lock pins 32 are not being pushed axially outwardly from pinion housing 20 by castellations 50 of right clutch plate 30. In an exemplary embodiment illustrated in FIG. 2, biasing elements 33 are resiliently deformable wave-type springs sized to be received upon respective outer cylindrical surfaces of side gears 14, 16 upon assembly, as illustrated.

The particular arrangement of castellations 50, 52, 54, and 56 facilitate the actuation of both right and left clutch plates 30, 34 along a common axial direction, e.g., toward differential end plate 38. In particular, rotatably fixed castellations 52 and 56 of pinion housing 20 and differential end plate 38, respectively, each extend axially away from their respective end surfaces 21, 39 toward actuator 22. Conversely, rotatable castellations 50, 54 of right and left clutch plates 30, 34, respectively, each extend axially away from their respective end surfaces 31, 35 and away from actuator 22. Thus, a single actuator 22 pushing actuator pins 26 toward rotatably fixed castellations 52 and 56, in cooperation with lock pins 32 which transmit axial motion of right clutch plate 30 to left clutch plate 34 as described above, operates to interfit castellations 50 with castellations 52 simultaneously with the interfitting of castellations 54 and castellations 56. In this way, both left and right side gear 14 and 16 are rotatably fixed to differential casing 12 by actuation of a single actuator 22.

In the illustrated embodiment of FIG. 2, actuator 22 is mounted upon protrusion 94, which is a monolithically formed feature of differential casing 12. Gasket 92 may also be received upon protrusion 94 to prevent ingress of fluid or other contaminants from infiltrating hollow cavity 36 of differential casing 12.

The order of assembly for locking differential 10 is best illustrated in FIG. 2. As noted above, actuator 22 and gasket 92 may be received upon protrusion 94 of differential casing 12, with actuator pins 26 received within actuation apertures 28. This assembly takes place along a first axial direction, opposed to an opposing axial direction leading into hollow cavity 36.

The remaining components of locking differential 10 (excluding axle half shafts 40, 42) take place along the opposing axial direction, as these remaining components are advanced into or toward the opening leading to hollow cavity 36. First, right clutch plate 30 is received into hollow cavity 36 along longitudinal axis A, followed by right side gear 16, which is placed into splined engagement with clutch plate 30 as described above.

Pinion housing 20 is then received within hollow cavity 36 to align pinion shaft apertures 100 formed in pinion housing 20 with corresponding pinion shaft apertures 102 formed in differential casing 12. Pinion gear 18 may then be received within the cavity of pinion housing 20, and pinion shaft 76a may be received entirely through apertures 102, 100, the axial bore of an opposing pair of pinion gears 18, and back through apertures 100 and 102. Pinion gear axial shafts 76b, which may be two separate half shaft pieces, may then be received within a respective set of apertures 102 and 100, and one of pinion gears 18.

Next, left side gear 14 is received within hollow cavity 36 and brought into splined engagement with pinion gears 18 as described above. Left clutch plate 34 is then received within hollow cavity 36 and brought into splined engagement with the outer surface of left side gear 14, also described above. Finally, differential end plate 38 is affixed to the end surface of differential casing 12, and fasteners 58 are used to affix end plate 38 to casing 12. With locking differential 10 thus assembled, differential casing 12 may be mounted into engagement with drive shaft 44 and axle half shafts 40, 42 as described above.

Figure 9:
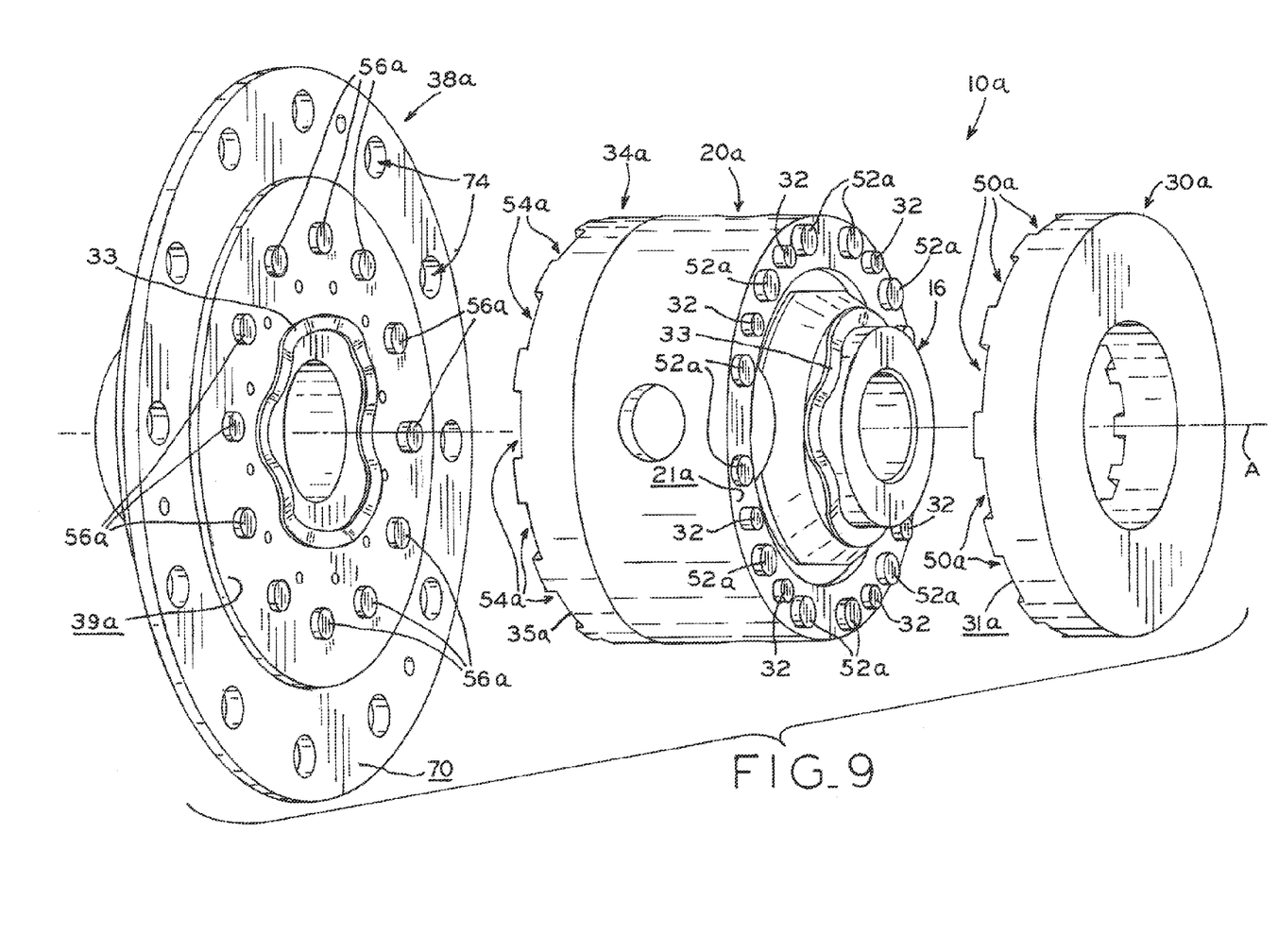
FIG. 9 is a perspective, partially exploded view of selected components of an alternative locking differential in accordance with the present disclosure, illustrating an unlocked configuration.
Figure 10:
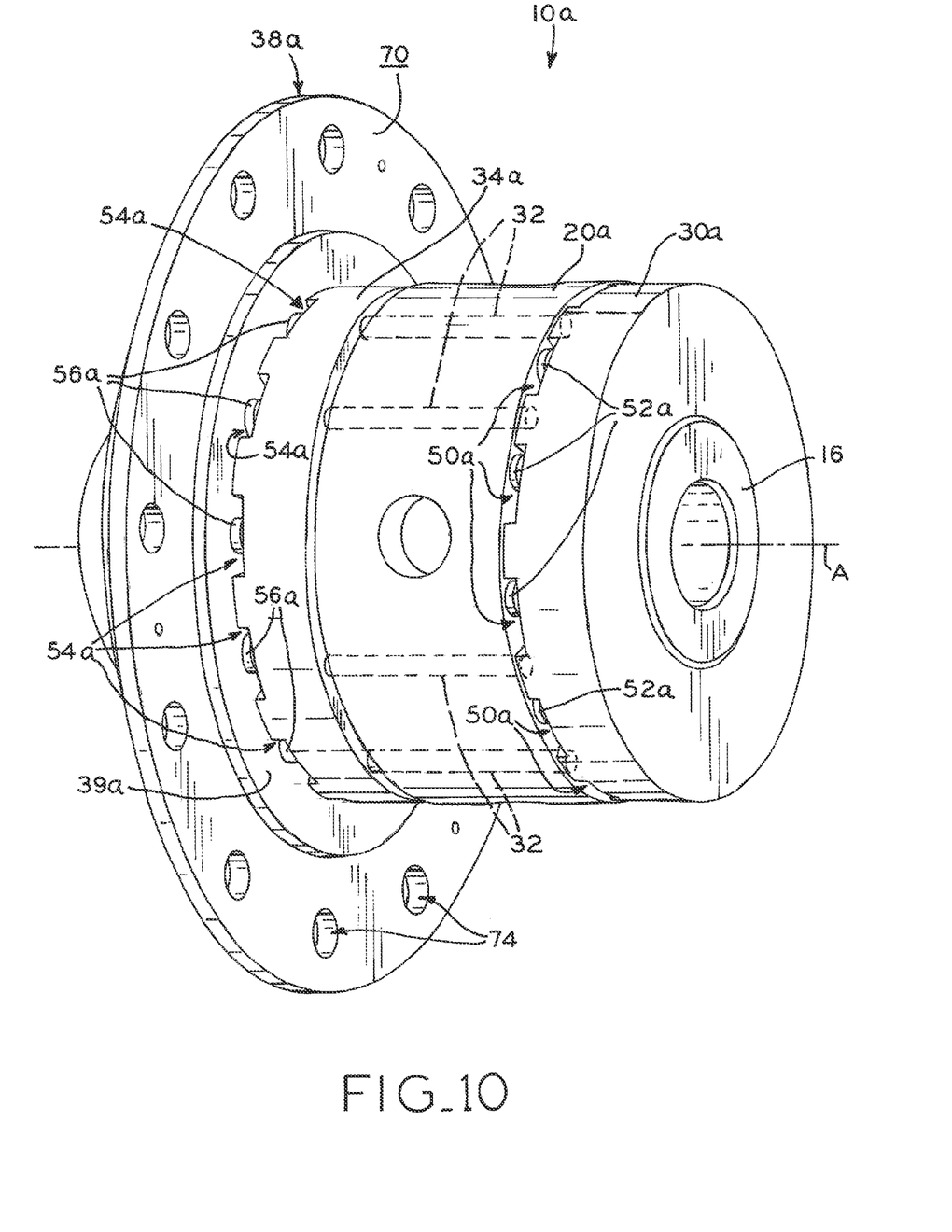
FIG. 10 is a perspective view of the selected components of the locking differential shown in FIG. 9, illustrating a locked configuration.

Turning now to FIGS. 9 and 10, selected components of an alternative locking differential 10a are shown. Differential 10a is nearly identical to locking differential 10 illustrated in FIGS. 1-8. Similar components of differential 10a are identified by the same reference numeral used with respect to differential 10 but are followed by the alphabetic designator "a". Moreover, differential 10 and differential 10a have all the same components with the same reference numeral designations, except as otherwise specified in the following discussion. Thus, for example, differential 10a includes differential casing 12 and actuator 22 even though these components are omitted from FIGS. 9 and 10 for clarity.

As best seen in FIG. 9, differential end plate 38a includes a plurality of pins 56a formed in end surface 39a, in which pins 56a extend inwardly into hollow cavity 36 of differential casing 12 and toward actuator 22 when end plate 38a is assembled to casing 12. Clutch plate 34a includes a corresponding plurality of receiving slots or recesses 54a sized and positioned to selectively receive pins 56a, such that when clutch plate 34a is urged into abutting contact with differential end plate 38a as shown in FIG. 10, pins 56a are received within recesses 54a to rotatably lock clutch plate 34a to differential casing 12 in similar fashion to rotatable locking of clutch plate 34 to casing 12 effected by interfitting of castellations 54 and 56 described above with respect to differential 10.

Similarly, a plurality of pins 52a are arranged around the periphery of end surface 21a of pinion housing 20a, and protrude from outwardly from end surface 21a toward actuator 22a. Clutch plate 30a includes a number of recesses 50a sized and positioned to selectively receive pins 52a. When pins 52a are received in recesses 50a as shown in FIG. 10, clutch plate 30a is rotatably fixed to pinion housing 20a in similar fashion to the rotatably fixed arrangement of clutch plate 30 when castellations 50, 52 are interfitted with one another as described above.

Moreover, it is contemplated that pins 52a, 56a may be considered rotatably fixed "castellations" for purposes of the present disclosure, as pins 52a, 56a form axially outwardly extending structures which can serve to rotatably fix clutch plates 30a, 34a to their respective adjacent structures. Similarly, the protrusions which respectively flank and define recesses 50a, 54a may also be considered rotatable "castellations" for the same reason.

Similar to differential 10, differential 10a utilizes a single actuator 22 which, when actuated, operates to urge clutch plate 30a toward pinion housing 20a and thereby rotatably fix both of clutch plates 30a to differential casing 12 via pinion housing 20a. As illustrated, pinion housing 20a includes a plurality of lock pins 32 which transmit the axial translation of clutch plate 30a to clutch plate 34a in the same manner as described above with respect to differential 10, such that actuation of actuator 22 also rotatably fixes clutch plates 34a to differential casing 12 via end plate 38a. Biasing elements 33 are provided to urge clutch plates 30a and 34a out of such engagement when actuator 22 is not actuated.

In an exemplary embodiment, pins 52a or pins 56a, or both, are separate components received in correspondingly formed bores formed in pinion housing 20a and end plate 38a, respectively. This facilitates efficient and inexpensive manufacture of pinion housing 20a and end plate 38a, while adding negligible time and effort to assembly of differential 10a.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A differential comprising:
    a differential casing defining a longitudinal axis, a first set of rotatably fixed castellations and a second set of rotatably fixed castellations affixed to said differential casing;
    a first side gear and a second side gear each rotatable with respect to said differential casing about the longitudinal axis, said first side gear and said second side gear each adapted to be rotatably fixed to a half shaft;
    at least one pinion gear intermeshingly engaged with said first side gear and said second side gear, said pinion gear rotatable about a pinion gear axis when said first side gear rotates at a rotational speed different from said second side gear;
    a first clutch plate rotatably fixed to said first side gear and having an end surface with a first set of rotatable castellations formed thereon, said first clutch plate axially moveable within said differential casing between an engaged position and a disengaged position,
        said first set of rotatable castellations interfitted with said first set of rotatably fixed castellations of said differential casing when said first clutch plate is in said engaged position,
        said first set of rotatable castellations spaced from said first set of rotatably fixed castellations of said differential casing when said first clutch plate is in said disengaged position,
        whereby said first side gear is selectively rotatably fixed to said differential casing via said first clutch plate; and
    a second clutch plate rotatably fixed to said second side gear and having an end surface with a second set of rotatable castellations formed thereon, said second clutch plate axially moveable within said differential casing between an engaged position and a disengaged position,
        said second set of rotatable castellations interfitted with said second set of rotatably fixed castellations of said differential casing when said second clutch plate is in said engaged position,
        said second set of rotatable castellations spaced from said second set of rotatably fixed castellations of said differential casing when said second clutch plate is in said disengaged position,
        whereby said second side gear is selectively rotatably fixed to said differential casing via said second clutch plate,
    whereby the differential has a locked condition in which each of said side gears is independently locked to the differential casing and torque is not transmitted through said pinion gear.

2. The differential of claim 1, further comprising a pinion housing rotatably affixed to said differential casing, said at least one pinion gear is rotatably mounted to said pinion housing, said pinion housing having an end surface with said first set of rotatably fixed castellations formed thereon.

3. The differential of claim 2, wherein said pinion housing comprises a substantially cylindrical shell having said at least one pinion gear mounted within said substantially cylindrical shell by a pinion gear axle, said pinion gear axle extending through said pinion housing and into said differential casing to rotatably fix said pinion housing to said differential casing.

4. The differential of claim 2, further comprising a differential end plate rotatably fixed to said differential casing, said differential end plate having an end surface with said second set of rotatably fixed castellations formed thereon.

5. The differential of claim 4, wherein said first and second sets of rotatably fixed castellations protrude from said end surfaces of said pinion housing and said differential end plate, respectively, along a common axial direction.

6. The differential of claim 4, further comprising an actuator urging said first clutch plate into its engaged position, said first clutch plate acting on said second clutch plate to urge said second clutch plate into its engaged position, whereby said rotatable castellations are urged toward said rotatably fixed castellations by actuation of said actuator.

7. The differential of claim 6, further comprising at least one lock pin passing through a wall of said pinion housing, an axial end of said at least one lock pin protruding outwardly from said end surface of said pinion housing between neighboring pairs of said first set of rotatably fixed castellations, such that interfitting of said first set of rotatable castellations into said first set of rotatably fixed castellations urges said at least one lock pin away from said end surface of said pinion gear and into contact with said second clutch plate.

8. The differential of claim 6, wherein said differential casing includes at least one actuation aperture formed in an end surface thereof, said actuator mounted to said differential casing adjacent said end surface and comprising at least one actuation pin protruding through said at least one actuation aperture, said at least one actuation pin selectively bearing against said first clutch plate to axially displace said first clutch plate from its disengaged position toward its engaged position.

9. The differential of claim 1, further comprising a ring gear affixed to said differential casing, said ring gear adapted to transmit power from a drive shaft to said differential casing.

10. The differential of claim 1, wherein said first and second sets of rotatably fixed castellations and said first and second sets of rotatable castellations all define respective lateral castellation walls having a draft angle with respect to the longitudinal axis of up to 5 degrees.

11. The differential of claim 1, wherein said first and second sets of rotatably fixed castellations comprise a plurality of pins, and said first and second sets of rotatable castellations flank and define a plurality of recesses sized and positioned to received said plurality of pins.

12. A differential comprising:
a differential casing having a hollow cavity formed therein, said hollow cavity defining a longitudinal axis;
a first side gear and a second side gear each rotatable with respect to said differential casing about the longitudinal axis, said first side gear and said second side gear each adapted to be rotatably fixed to a half shaft;
a pinion housing rotatably affixed to said differential casing and having an end surface with a first set of rotatably fixed castellations formed thereon;
at least one pinion gear intermeshingly engaged with said first side gear and said second side gear, said pinion gear rotatably mounted to said pinion housing;
a differential end plate rotatably fixed to said differential casing, said differential end plate having an end surface with a second set of rotatably fixed castellations formed thereon;
a first clutch plate rotatably fixed to said first side gear and having an end surface with a first set of rotatable castellations formed thereon, said first clutch plate axially moveable along a first direction from a disengaged position in which said first set of rotatable castellations are spaced from said first set of rotatably fixed castellations of said pinion housing, toward an engaged position in which said first set of rotatable castellations are intermeshingly engaged with said first set of rotatably fixed castellations; and
a second clutch plate rotatably fixed to said second side gear and having an end surface with a second set of rotatable castellations formed thereon, said second clutch plate axially moveable along the first direction from a disengaged position in which said second set of rotatable castellations are spaced from said second set of rotatably fixed castellations of said differential end plate, toward an engaged position in which said second set of rotatable castellations are intermeshingly engaged with said second set of rotatably fixed castellations.

13. The differential of claim 12, wherein said first side gear, said second side gear, said pinion housing, said at least one pinion gear, said first clutch plate and said second clutch plate all disposed in said hollow cavity of said differential casing, said differential further comprising:
an actuator having at least one actuation pin actuatable to a locked configuration in which said actuation pin advances in said first direction to protrude into said hollow cavity of said differential casing and simultaneously urge said first clutch plate and said second clutch plate in said first direction toward their respective engaged positions,
said actuation pin actuatable to an unlocked configuration in which said actuation pin withdraws from said hollow cavity to simultaneously allow said first clutch plate and said second clutch plate to move opposite said first direction and toward their respective disengaged positions.

14. The differential of claim 13, wherein said first and second sets of rotatably fixed castellations and said first and second sets of rotatable castellations all define respective lateral castellation walls having a draft angle with respect to the longitudinal axis of up to 5 degrees.

15. The differential of claim 13, wherein said first and second sets of rotatably fixed castellations comprise a plurality of pins extending outwardly from respective end surfaces of said pinion housing and said differential end plate, and said and said first and second sets of rotatable castellations flank and define a plurality of recesses formed in respective end surfaces of said first clutch plate and said second clutch plate, said plurality of recesses respectively sized and positioned to received said plurality of pins.

16. A differential comprising:
a differential casing having a hollow cavity formed therein, said hollow cavity defining a longitudinal axis, a first set of rotatably fixed castellations and a second set of rotatably fixed castellations affixed to said differential casing within said hollow cavity;
a first side gear and a second side gear each disposed in said hollow cavity and rotatable with respect to said differential casing about the longitudinal axis, said first side gear and said second side gear each adapted to be rotatably fixed to a half shaft;
at least one pinion gear disposed in said hollow cavity and intermeshingly engaged with said first side gear and said second side gear;
a first clutch plate disposed in said hollow cavity and rotatably fixed to said first side gear and having an end surface with a first set of rotatable castellations formed thereon, said first clutch plate axially moveable from a disengaged position in which said first set of rotatable castellations are spaced from said first set of rotatably fixed castellations, toward an engaged position in which said first set of rotatable castellations are intermeshingly engaged with said first set of rotatably fixed castellations;
a second clutch plate disposed in said hollow cavity and rotatably fixed to said second side gear and having an end surface with a second set of rotatable castellations formed thereon, said second clutch plate axially moveable from a disengaged position in which said second set of rotatable castellations are spaced from said second set of rotatably fixed castellations, toward an engaged position in which said second set of rotatable castellations are intermeshingly engaged with said second set of rotatably fixed castellations; and
an actuator having at least one actuation pin actuatable to a locked configuration in which said actuation pin advances into said hollow cavity of said differential casing to simultaneously urges said first clutch plate and said second clutch plate toward their respective engaged positions.

17. The differential of claim 16, wherein said actuator comprises an actuator body disposed outside said hollow cavity of said differential casing.

18. The differential of claim 16, wherein said actuation pin is actuatable to an unlocked configuration in which said actuation pin withdraws from said hollow cavity to simultaneously allow said first clutch plate and said second clutch plate to move toward their respective disengaged positions.

19. The differential of claim 16, further comprising a pinion housing disposed in said hollow cavity and rotatably affixed to said differential casing, said pinion housing and having an end surface with said first set of rotatably fixed castellations formed thereon.

20. The differential of claim 16, further comprising a differential end plate enclosing an open end of said hollow cavity, said differential end plate rotatably fixed to said differential casing, said differential end plate having an end surface with said second set of rotatably fixed castellations formed thereon.

* * * * *